United States Patent
Bell et al.

(10) Patent No.: US 10,637,226 B2
(45) Date of Patent: Apr. 28, 2020

(54) LOW PIM STACKABLE CABLE HANGER

(71) Applicant: ConcealFab Corporation, Colorado Springs, CO (US)

(72) Inventors: Thomas Bell, Colorado Springs, CO (US); Steve Rogers, Colorado Springs, CO (US)

(73) Assignee: ConcealFab Corporation, Colorado Springs, CO (US)

( * ) Notice: Subject to any disclaimer, the term of this patent is extended or adjusted under 35 U.S.C. 154(b) by 0 days.

(21) Appl. No.: 16/581,597

(22) Filed: Sep. 24, 2019

(65) Prior Publication Data

US 2020/0099212 A1 Mar. 26, 2020

Related U.S. Application Data

(60) Provisional application No. 62/735,360, filed on Sep. 24, 2018.

(51) Int. Cl.
| | |
|---|---|
| *F16L 3/08* | (2006.01) |
| *H02G 7/05* | (2006.01) |
| *F16L 3/22* | (2006.01) |
| *F16L 3/21* | (2006.01) |
| *F16L 3/13* | (2006.01) |

(Continued)

(52) U.S. Cl.
CPC .............. *H02G 7/053* (2013.01); *F16L 3/222* (2013.01); *F16L 3/1211* (2013.01); *F16L 3/13* (2013.01); *F16L 3/2056* (2013.01); *F16L 3/21* (2013.01)

(58) Field of Classification Search
CPC .......... F16L 3/222; F16L 3/1211; F16L 3/13; H02G 7/053

USPC ...... 248/68.1, 62, 72, 63, 74.1, 71, 65, 67.7, 248/74.4, 74.2, 73; 174/72 A; 24/295, 24/289, 292

See application file for complete search history.

(56) References Cited

U.S. PATENT DOCUMENTS

| | | |
|---|---|---|
| 4,595,185 A | 6/1986 | Kitagawa |
| 5,794,897 A | 8/1998 | Jobin et al. |
| 6,354,543 B1 | 3/2002 | Paske |

(Continued)

OTHER PUBLICATIONS

PCT International Search Report and Written Opinion, dated Dec. 3, 2019.

(Continued)

*Primary Examiner* — Todd M Epps
(74) *Attorney, Agent, or Firm* — Mehrman Law Office; Michael J. Mehrman (57) ABSTRACT

A stackable, low-PIM cable hanger includes a hybrid metal-and-polymeric construction including a metal cable block carrying a polymeric sleeve. The metal cable block forms the cable mounting section, while the polymeric sleeve insulates the metal sides of the cable block and provides non-metallic (low-PIM) snap-in legs for attaching the cable hanger to mounting structures and stacking the cable hangers together. The metal cable block supports the cable more securely than a polymeric mounting section, while the polymeric sleeve avoids loose metal-to-metal connections when the cable hangers are attached to metal mounting structures or stacked together. The metal cable block includes a metal sides that form cable clasps. The sleeve includes polymeric sides that cover the metal sides of the cable block to prevent metal-to-metal contact on the sides of the cable block.

17 Claims, 10 Drawing Sheets

(51) Int. Cl.
*F16L 3/205* (2006.01)
*F16L 3/12* (2006.01)

(56) References Cited

U.S. PATENT DOCUMENTS

| | | |
|---|---|---|
| 6,443,402 B1 | 9/2002 | Ferrill et al. |
| 6,899,305 B2 | 3/2005 | Korczak et al. |
| 8,011,621 B2 | 9/2011 | Korczak |
| 8,439,316 B2 * | 5/2013 | Feige ................... F16L 3/13 |
| | | 248/71 |
| 9,086,175 B2 * | 7/2015 | Feige ................... F16L 3/10 |
| 9,853,434 B2 | 12/2017 | Vaccaro |
| 9,866,004 B2 * | 1/2018 | Vaccaro ................ E01F 9/65 |
| 9,903,510 B2 | 2/2018 | Joshi et al. |
| 9,995,414 B2 | 6/2018 | Joshi et al. |
| 10,158,218 B2 | 12/2018 | Vaccaro et al. |
| 10,243,339 B2 | 3/2019 | Vaccaro et al. |
| 10,253,906 B2 | 4/2019 | Vaccaro |
| 10,422,446 B2 | 9/2019 | Joshi et al. |
| 2002/0005463 A1 | 1/2002 | Paske et al. |
| 2002/0066833 A1 | 6/2002 | Ferrill et al. |
| 2005/0109890 A1 * | 5/2005 | Korczak ................ F16L 3/12 |
| | | 248/74.1 |
| 2009/0230256 A1 * | 9/2009 | Widlacki ............... F16L 3/222 |
| | | 248/68.1 |
| 2009/0294602 A1 | 12/2009 | Korczak |
| 2011/0226913 A1 | 9/2011 | Feige |
| 2014/0086704 A1 * | 3/2014 | Hemingway ........... B22F 5/06 |
| | | 411/392 |
| 2017/0122460 A1 | 5/2017 | Joshi et al. |

OTHER PUBLICATIONS

SitePro1 a Valmont Company (website), https://www.sitepro 1.com/store/cart.ph p?rn=product_list&c= 1, Oct. 21, 2006.
Petrilla Technologies, LLC (website), https://petrillatechnologies.com/support-accessories.html, Mar. 24, 2017.
CommScope (website), https://www.commscope.com/catalog/tools_accessories/product.aspx?id=46, Oct. 28, 2012.

* cited by examiner

LOW PIM STACKABLE CABLE HANGER

REFERENCE TO RELATED APPLICATION

This application claims priority to U.S. Provisional Patent Application Ser. No. 62/735,360 filed Sep. 24, 2018, which is incorporated by reference.

TECHNICAL FIELD

The present invention is directed to cellular communication systems and, more particularly, to a low-PIM stackable cable hanger used to reduce passive intermodulation interference (PIM) at cellular telephone base station antenna sites.

BACKGROUND

An essential element of modern mobile communications systems is the cellular telephone base station, also known as a "cell site." The cell site includes one or more directional base station antennas aimed at a desired geographical area of coverage with coaxial cables connecting the antennas to base station radio equipment. The performance of a cell site is often limited by passive intermodulation (PIM) interference. PIM interference occurs when the high-power downlink signals transmitted by the base station antennas mix at passive, non-linear junctions in the RF path, creating new signals known as intermodulation products. When these intermodulation products fall in an operator's uplink band, they act as interference and reduce the SINR (signal to interference plus noise ratio). As the SINR is reduced, the geographic coverage and data capacity of the cell site is reduced.

It is well documented that loosely touching metal-to-metal surfaces can behave in a non-linear fashion and become sources of PIM interference when illuminated by high power RF (radio frequency) signals. Recently, it has been determined that loose metal-to-metal connections located behind base station antennas are also able to generate high levels of PIM interference. Even though this region is well outside the main beam of the antenna, enough RF energy is present in this region to excite non-linear objects and generate PIM interference. Based on field measurements it has been determined that loose metal-to-metal contacts located very close to base station antennas (within 1 wavelength of the carrier frequency) are more likely to generate high levels of PIM interference than loose metal-to-metal contacts located farther away (greater than 1 wavelength) from base station antennas.

A common source of loose metal-to-metal contact found in the region close to the base station antenna is metal brackets and associated hardware for supporting coaxial cables. Coaxial cables, typically ½-inch in diameter, are used to transfer RF signals between tower mounted radio equipment and the base station antenna. These cables need to be mechanically supported periodically along their length to prevent movement of the cable in the wind. The metal antenna mounting pipe close to the back of the base station antenna provides a convenient rigid surface to mechanically secure these coaxial cables. At operating frequencies at or below 2 GHz, this mounting pipe is typically located within 1 wavelength of the antenna within the zone of high PIM concern.

Two different methods for mechanically supporting coaxial cables are commonly found at cell sites. The first utilizes two plastic clamp blocks that fit around one or more coaxial cables. An example of this style cable support block is disclosed in Jobin et al., U.S. Pat. No. 5,794,897, which is incorporated by reference. A ⅜-inch or 10 mm diameter stainless steel threaded fastener is inserted into the support block pairs and stainless-steel hardware is installed to clamp the plastic block halves together on the threaded fastener. A steel interface bracket is often attached to one end of the threaded fastener using nuts and lock washers. The interface bracket is then secured to the antenna mounting pipe or other nearby metal members using a stainless-steel hose clamp. The hose clamp provides a convenient method for securing interface brackets to metal members since the hose clamp conforms easily to different shapes and is adjustable in length allowing it to fit around a wide variety of metal member sizes.

Another common system used for mechanically supporting coaxial cables uses metal "snap-in" style cable support hangers. The snap-in cable support hangers are made from thin "U" or "C" shaped stainless-steel members designed to wrap around individual coaxial cables. The hangers include locking features able to insert into round holes in supporting interface brackets. Once inserted, the locking features on the hanger expand outward to secure the cable to the interface bracket. A variation of this style cable hanger design includes a hole on one end of the hanger to accept an additional cable hanger. This enables multiple coaxial cables to be secured to a single interface bracket by stacking one hanger on top of another. Examples of this style cable hanger are disclosed in Paske, U.S. Pat. No. 6,354,543 and Feige, U.S. Pat. No. 8,439,316.

A problem with these conventional designs is that PIM can be generated at the metal-to-metal contacting surfaces between stacked metal snap-in style cable hangers and at the metal-to-metal contacting surface between the interface bracket and the snap-in hanger. Manufacturers such as Commscope have introduced plastic versions of their stackable snap-in style cable support hangers that eliminate the metal-to-metal contacting surfaces that generate PIM. These all-plastic snap-in cable hangers, however, introduce new problems. First, the all-plastic snap-in hangers are not as strong as the all-metal snap-in hangers. This limits the number of cables that can be reliably stacked on top of each other for a given support spacing. The all-plastic snap-in hangers are also prone to breaking, for example during installation when the plastic locking features are overstressed due to misalignment.

A second problem with all-plastic snap-in hangers is that the plastic material used to produce these hangers is not able to bite into the cable jacket as effectively as all-metal snap-in hangers. This reduces the all-plastic hanger's ability to prevent longitudinal movement of the cable due to wind forces or due to gravity when the cable is oriented vertically.

A third problem with the existing all-plastic snap-in hangers is that they are not able to rotate freely at the hanger-to-hanger interface. Due to geometry constraints, the all-plastic hangers are only able to connect to one another in a fixed orientation. This requires all supported cables to be parallel to each other at the point of support. Cables that are not perfectly parallel stress the plastic supports, leading to breakage. Mechanical stress is also imposed on the RF cable, leading to cable deformation and reduced RF performance.

An improved low PIM snap-in style cable hanger is therefore needed to overcome the limitations of the existing alternatives.

SUMMARY

The present invention meets the needs described above through a low-PIM stackable cable hanger used to reduce PIM (passive intermodulation) interference at cellular telephone base station antenna sites. The cable hanger includes a hybrid metal-and-polymeric construction including a metal cable block carrying a polymeric sleeve. The metal cable block forms the cable mounting section, while the polymeric sleeve insulates the metal sides of the cable block and provides non-metallic (low-PIM) snap-in legs for attaching the cable hanger to mounting structures and stacking the cable hangers together. The metal cable block supports the cable more securely than a polymeric mounting section, while the polymeric sleeve avoids loose metal-to-metal connections when the cable hangers are attached to metal mounting structures or stacked together. The metal cable block includes metal sides that form metal cable clasps, while the sleeve includes polymeric sides that cover the metal sides of the cable block to prevent metal-to-metal contact on the sides of the cable block.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Embodiments of the invention include a stackable, low-PIM cable hanger, and arrays of these cable hangers, used to reduce passive intermodulation interference at cellular telephone base station antenna sites. These embodiments may be utilized in concert with other techniques to reduce PIM at cellular base stations, such as the low-PIM cable bracket described in commonly owned U.S. patent application Ser. No. 16/450,925, which is incorporated by reference.

An illustrative embodiment of the stackable, low-PIM cable hanger includes a hybrid metal-and-polymeric construction including a metal cable block carrying a polymeric sleeve. The metal cable block forms the cable mounting section, while the polymeric sleeve insulates the metal sides of the cable block and provides non-metallic (low-PIM) snap-in legs for attaching the cable hanger to mounting structures and stacking the cable hangers together. The metal cable block supports the cable more securely than a polymeric mounting section, while the polymeric sleeve avoids loose metal-to-metal connections when the cable hangers are attached to metal mounting structures or stacked together.

The metal cable block includes a receptacle side with a receptacle flange defining a receptacle hole. The receptacle side is referred to as the "top" side as a matter of descriptive convenience, although it will be appreciated that the receptacle can be placed in any orientation. Additional opposing sides of the cable block extending away from the receptacle side have portions that are punched-out on three sides forming a pair of opposing cable clasps that extend into the cable block to securely grasp a cable passing through the cable block. The cable block also includes a pair of metal block clips that help to secure the cable block to the polymeric sleeve. The metal cable block may be stainless steel, as used in conventional stackable cable hangers, or any other suitable material. The geometry of the cable block is very similar to existing all-metal designs where metal barbs on one hanger engage with a hole on the top of the next hanger. The barbs prevent the hangers from separating from each other but do not prevent rotation between hangers. This allows cables at different angles to be attached without generating high stress on the cable or the mating hangers.

The polymeric sleeve includes polymeric sides that cover associated metal sides of the cable block. This prevents the metal sides of adjacent cable blocks from rubbing or banging into each other, for example in the wind, which could generate PIM. The polymeric sleeve also includes a pair of polymeric sleeve clips that, along with the metal block clips, secure the cable block to the polymeric sleeve. The polymeric sleeve also includes a pair of snap-in legs with barb heads that are configured to snap into the receptacle hole of an adjacent cable block. The snap-in legs are deflected toward each other as they are pressed into a receptacle hole, such as a receptacle hole on a mounting surface or another cable hanger. The snap-in legs then spring away from each after the barb heads clear the receptacle flange to capture the snap-in legs in the receptacle hole. The polymeric sleeve may be made from a UV stable plastic material, such as glass-filled Nylon.

It should be noted that the metal cable block includes a metal receptacle flange that forms a component of the locking system used to stack the hangers together. This locking system is stronger than the locking system of comparably sized all-plastic hangers, while the polymeric snap-in legs of the adjacent cable hanger avoid metal-to-metal contact in the locking section to eliminate PIM. This allows the metal cable block to support the mechanical loads acting on the hanger by wind or gravity, while the mechanical stress level on the polymeric snap-in legs remains relatively low due to large surface areas of polymeric barb heads. A variety of techniques can be used to attach the metal cable block to the polymeric sleeve. The illustrative embodiment uses a pair of metal block clips and a pair of opposing sleeve clips. Other approaches may be used, such as molding the polymeric material in the locking section around metal legs of the cable block, or mechanically attaching the polymeric sleeve to the metal cable block using a heat staking or adhesive bonding process.

Figure 1:
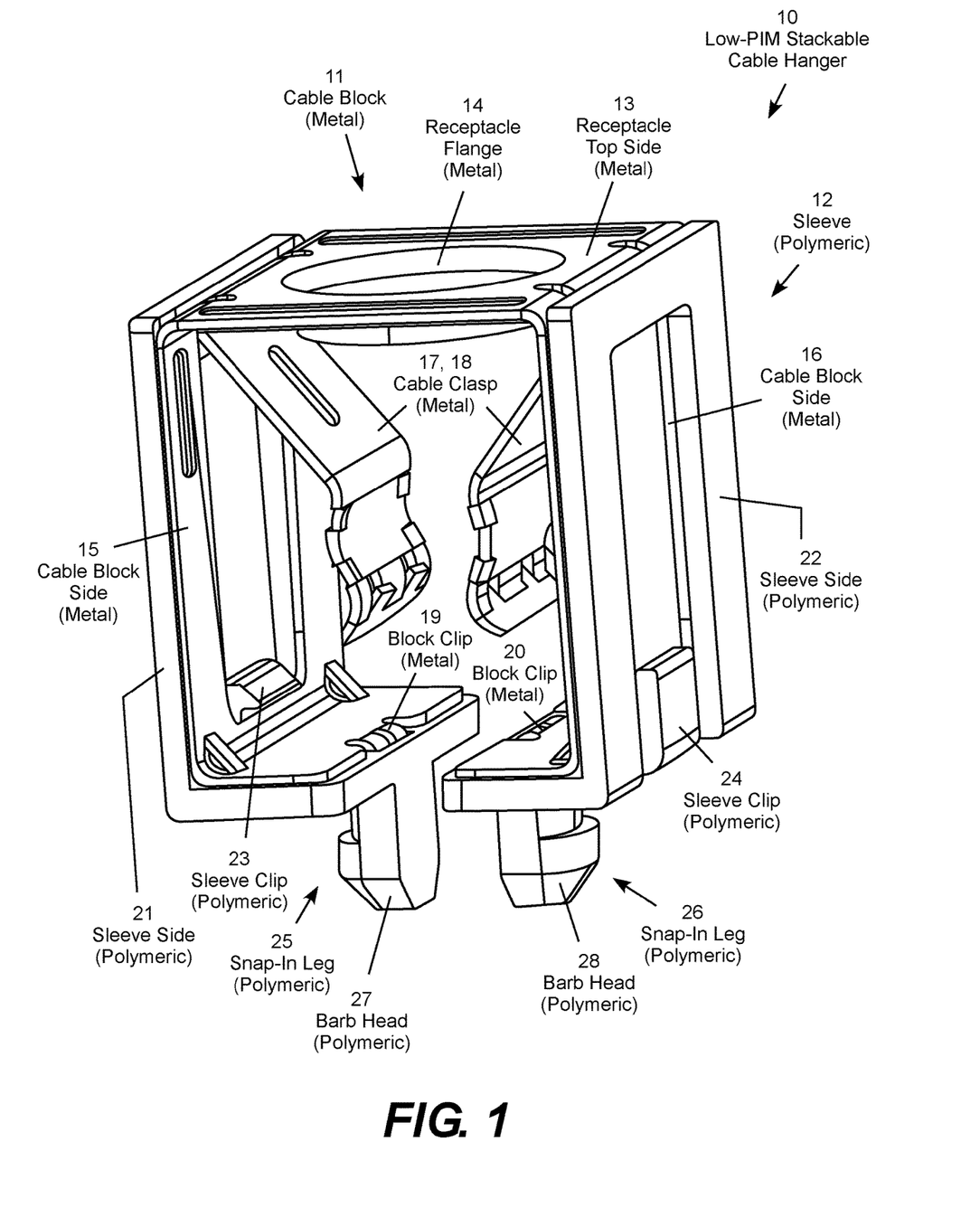
FIG. 1 is a perspective front, top view of a stackable, low-PIM cable hanger.
Figure 2A:
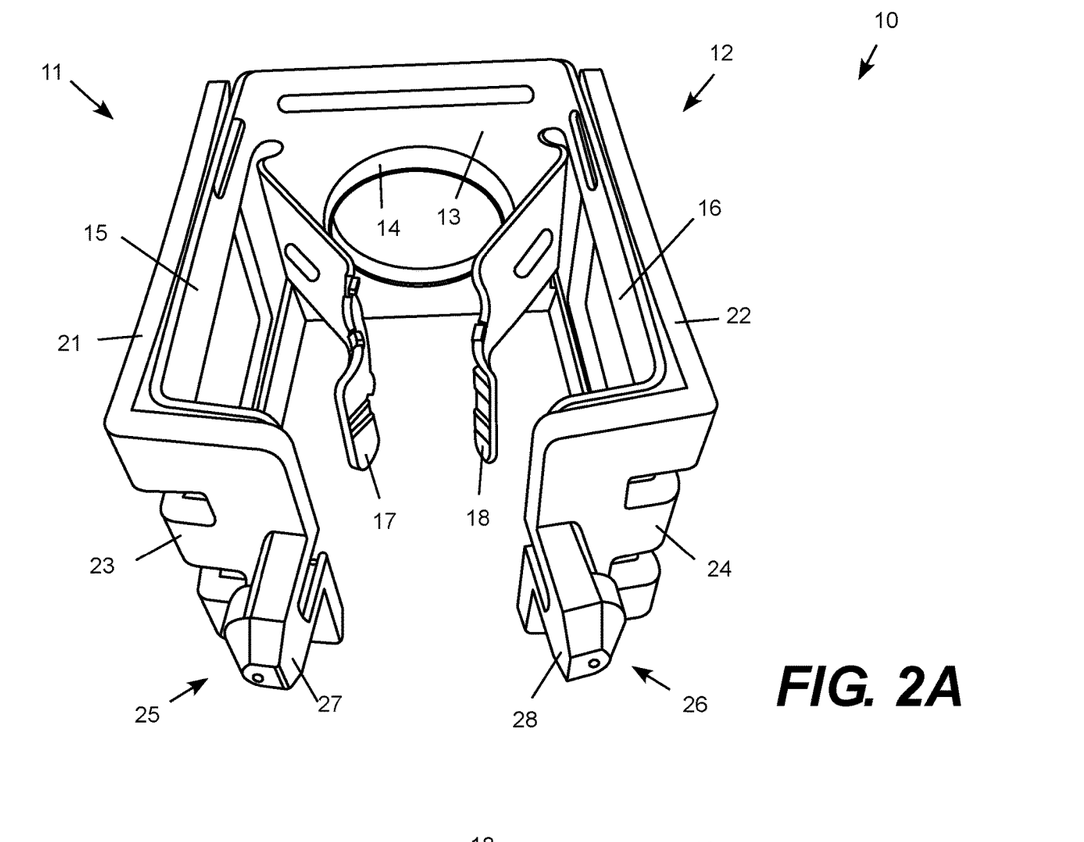
FIG. 2A is a perspective front, bottom view of the stackable, low-PIM hanger.
Figure 2B:
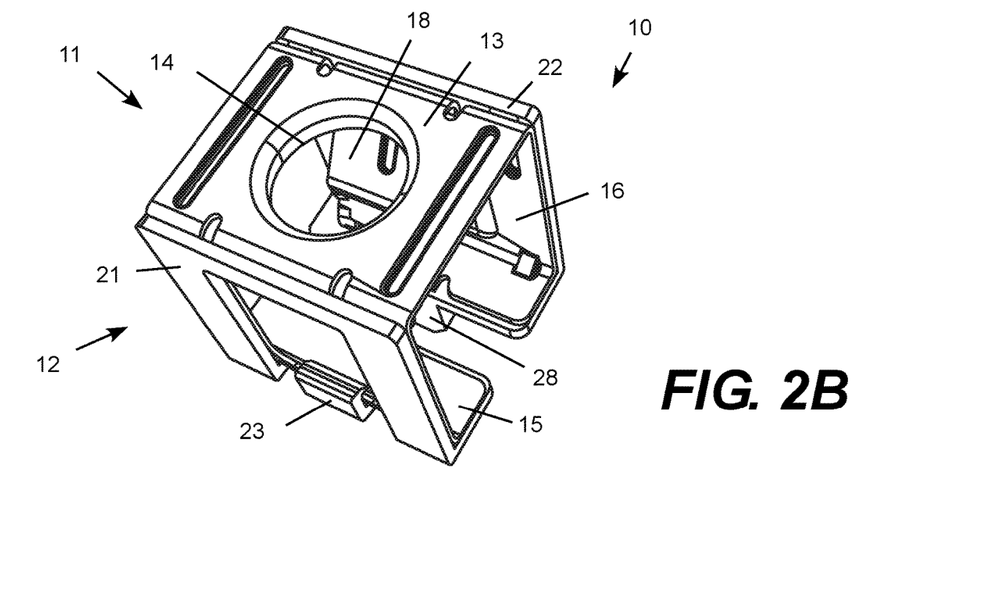
FIG. 2B is a perspective front, top view of the stackable, low-PIM hanger.

FIGS. 1 and 2A-2B show perspective views of the stackable, low-PIM hanger 10. This hybrid metal-and-polymeric cable hanger includes a metal cable block 11 attached to a polymeric sleeve 12. The metal cable block 11 forms the cable mounting section, while the polymeric sleeve 12 insulates the metal sides of the cable block and provides non-metallic (low-PIM) snap-in legs for attaching the cable hanger to mounting structures and stacking the cable hangers together. The metal cable block 11 supports the cable more securely than a polymeric mounting section, while the polymeric sleeve 12 avoids loose metal-to-metal connections when the cable hangers are attached to metal mounting structures or stacked together.

The metal cable block 11 includes a receptacle side 13 (shown as the top side in FIGS. 1 and 2A-2B) with a receptacle flange 14 defining a receptacle hole at the top of block. Additional opposing sides 15, 16 of the cable block 11 have portions that are punched-out on three sides forming a pair of opposing cable clasps 17, 18 that extend into the cable block 11 to securely grasp a cable passing through the cable block. The cable block 11 also includes a pair of metal block clips 19, 20 that help to secure the cable block to the polymeric sleeve 12. The metal cable block 11 may be stainless steel, as used in conventional stackable cable hangers, or any other suitable material. The geometry of the cable block 11 is very similar to existing all-metal designs where metal barbs on one hanger engage with a hole on the top of the next hanger. The barbs prevent the hangers from separating from each other but do not prevent rotation between hangers. This allows cables at different angles to be attached without generating high stress on the cable or the mating hangers.

The polymeric sleeve 12 includes polymeric sides 21, 22 that cover the metal sides 15, 16, respectively, of the cable block 11. This prevents the metal sides of adjacent cable blocks from rubbing or banging into each other, for example in the wind, which could generate PIM. The polymeric sleeve 12 also includes a pair of polymeric sleeve clips 23, 24 that that help to secure the cable block 11 to the polymeric sleeve 12. The polymeric sleeve 12 also includes a pair of snap-in legs 25, 26 with barb heads 27, 28, respectively, that are configured to snap into the receptacle hole of an adjacent cable block. The snap-in legs 25, 26 are deflected toward each other as they are pressed into a receptacle hole, such as a receptacle hole on a mounting surface or another cable hanger. The snap-in legs then spring away from each after the barb heads clear the receptacle flange to capture the snap-in legs in the receptacle hole. The polymeric sleeve 12 may be made from a UV stable plastic material, such as glass-filled Nylon.

Figure 3:
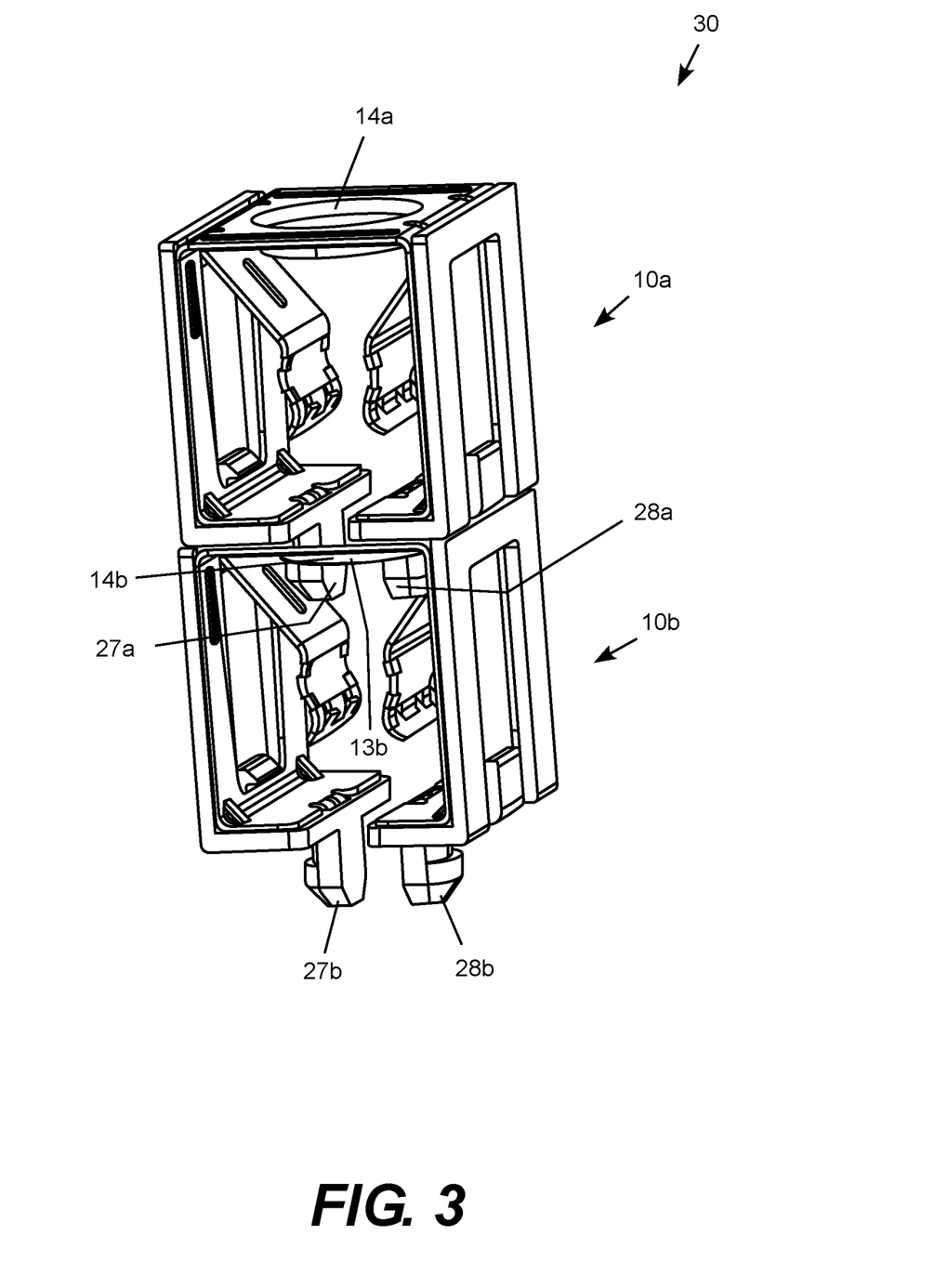
FIG. 3 is a perspective view of a stacked pair of the stackable, low-PIM cable hangers.

FIG. 3 is a perspective view of a stacked pair 30 of the stackable, low-PIM cable hangers 10a, 10b. The snap-in legs of the upper cable hanger 10a extend through the receptacle hole of the lower cable hanger 10b, with the barb heads 27a, 28a of the upper cable hanger 10a captured by the receptacle flange 14b of the lower cable hanger 10b. The barb heads 27a, 28a of the upper cable hanger 10a slide with respect to the flange receptacle flange 14b of the lower cable hanger 10b allowing the upper cable hanger 10a to rotate with respect to the lower cable hanger 10b. This arrangement keeps the cable hangers 10a, 10b attached to each other, while allowing them to rotate with respect to each other to accommodate different cable support directions. The locking system allows two or more cable hangers to be attached to each other into an array cable hangers. In addition to allowing attachment to each other, the cable hangers may also be attached to other structures, such as mounting plates, in the same manner.

Figure 4:
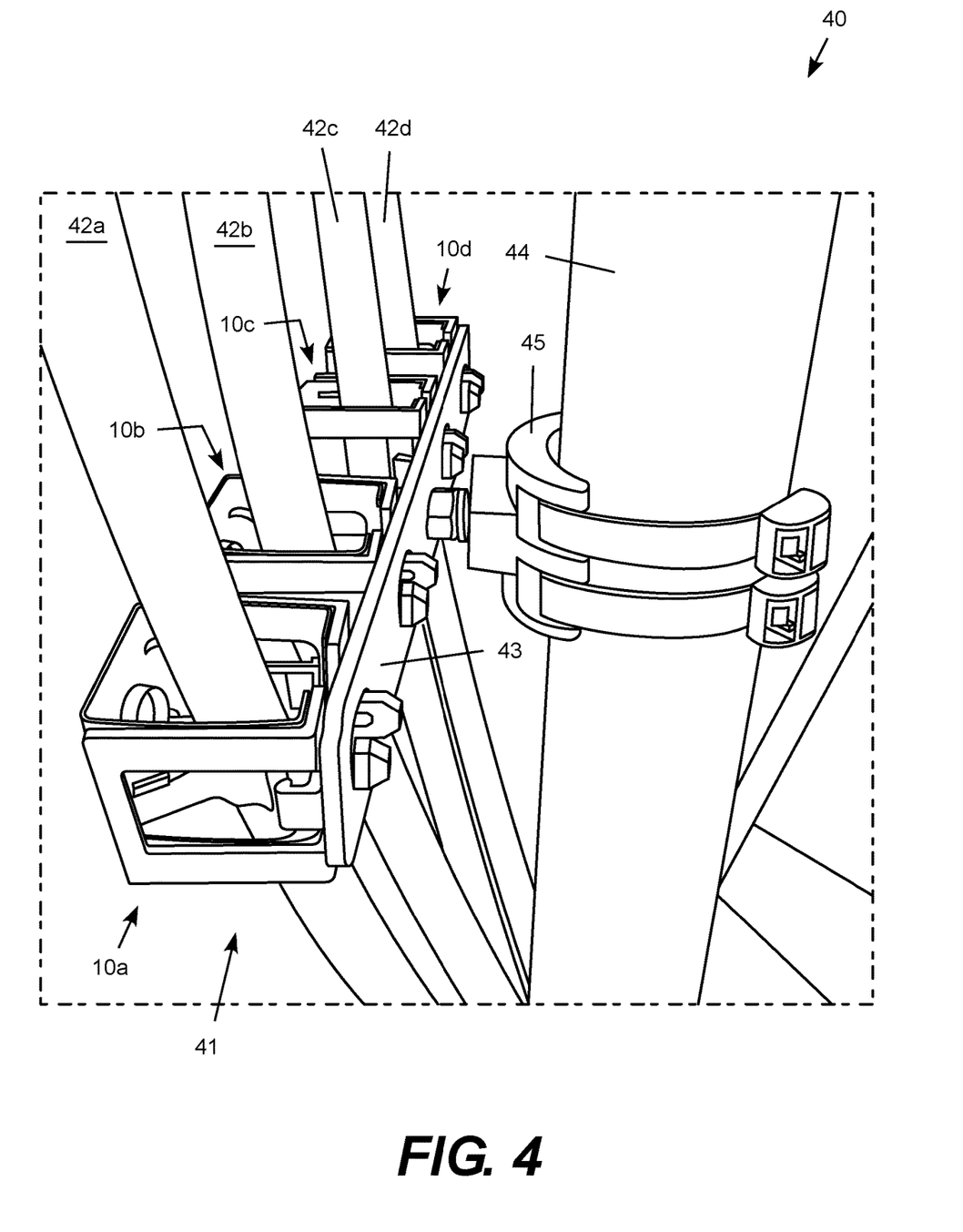
FIG. 4 is a perspective view of a portion of a cellular base station antenna site using a lateral array of the stackable, low-PIM cable hanger.

FIG. 4 is a perspective view of a portion 40 of a cellular base station antenna site using a lateral array 41 of the stackable, low-PIM cable hangers 10a-10d. In this embodiment, cable hanger 10a supports an associated cable 42a, the cable hanger 10b supports an associated cable 42b, the cable hanger 10c supports an associated cable 42c, and the cable hanger 10d supports an associated cable 42d. Each cable hanger 10a-10d is supported by a common mounting plate 43 which, in turn, is connected to an upright support pole 44. In this particular example, the mounting plate 43 is connected to the support pole 44 using a low-PIM cable bracket 45 described in commonly owned U.S. patent application Ser. No. 16/450,925, which is incorporated by reference.

Figure 5:
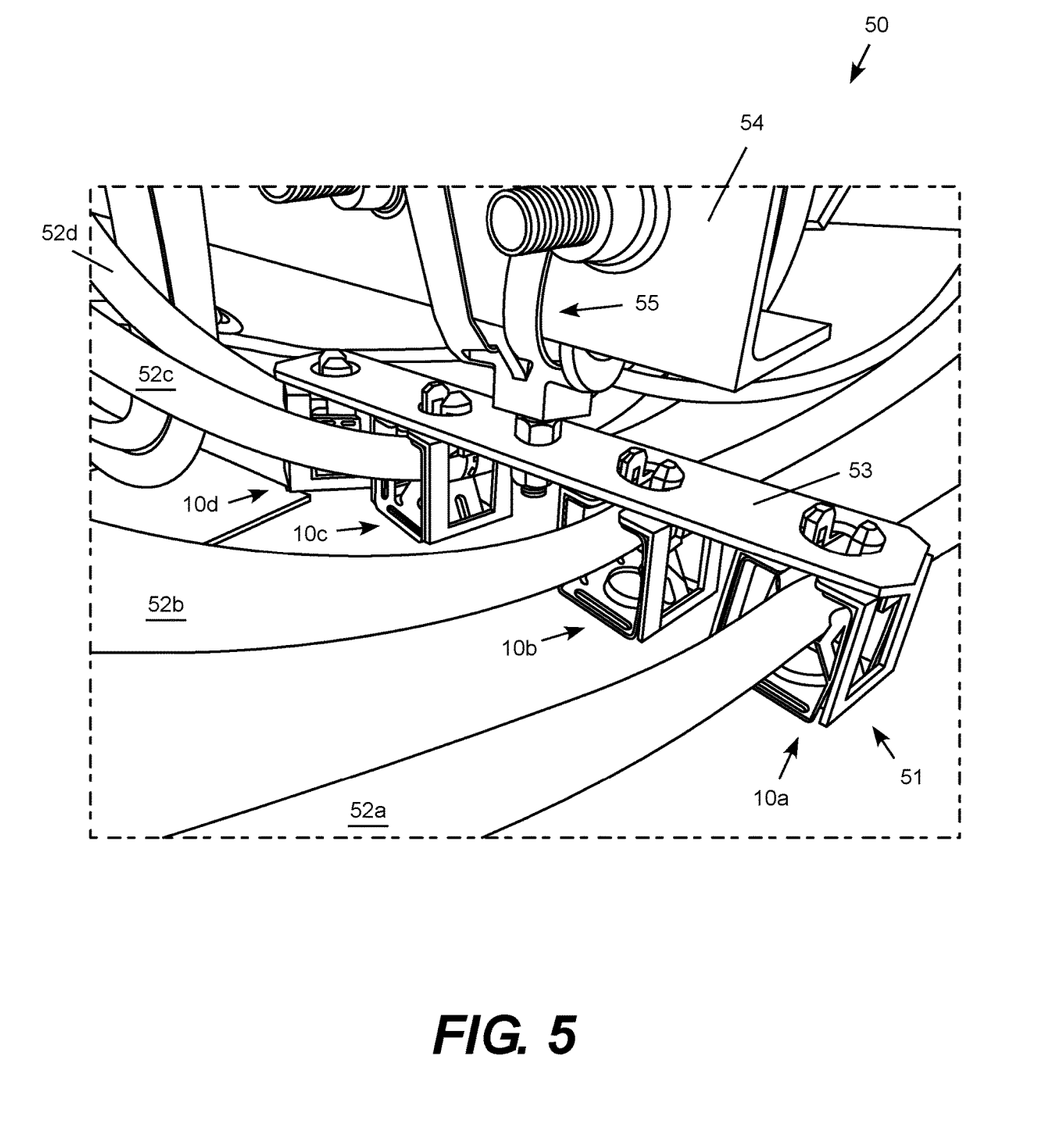
FIG. 5 is a perspective view of a portion of a cellular base station antenna site using the lateral array of the stackable, low-PIM cable hanger in an alternative configuration.

Other arrangements may be used to connect the mounting plate to a support pole or other structure. To provide an additional example, FIG. 5 is a perspective view of another portion 50 of a cellular base station antenna site using a similar lateral array 51 of the stackable, low-PIM cable hangers 10a-10d. The cable hanger 10a supports an associated cable 52a, the cable hanger 10b supports an associated cable 52b, the cable hanger 10c supports an associated cable 52c, and the cable hanger 10d supports an associated cable 52d. Each cable hanger 10a-10d is supported by a common mounting plate 53 which, in turn, is connected to a lateral support bar 54. In this particular example, the mounting plate 53 is connected to the support bar 54 using a hanger 55 that supports the mounting plate under the lateral support bar 54.

Figure 6:
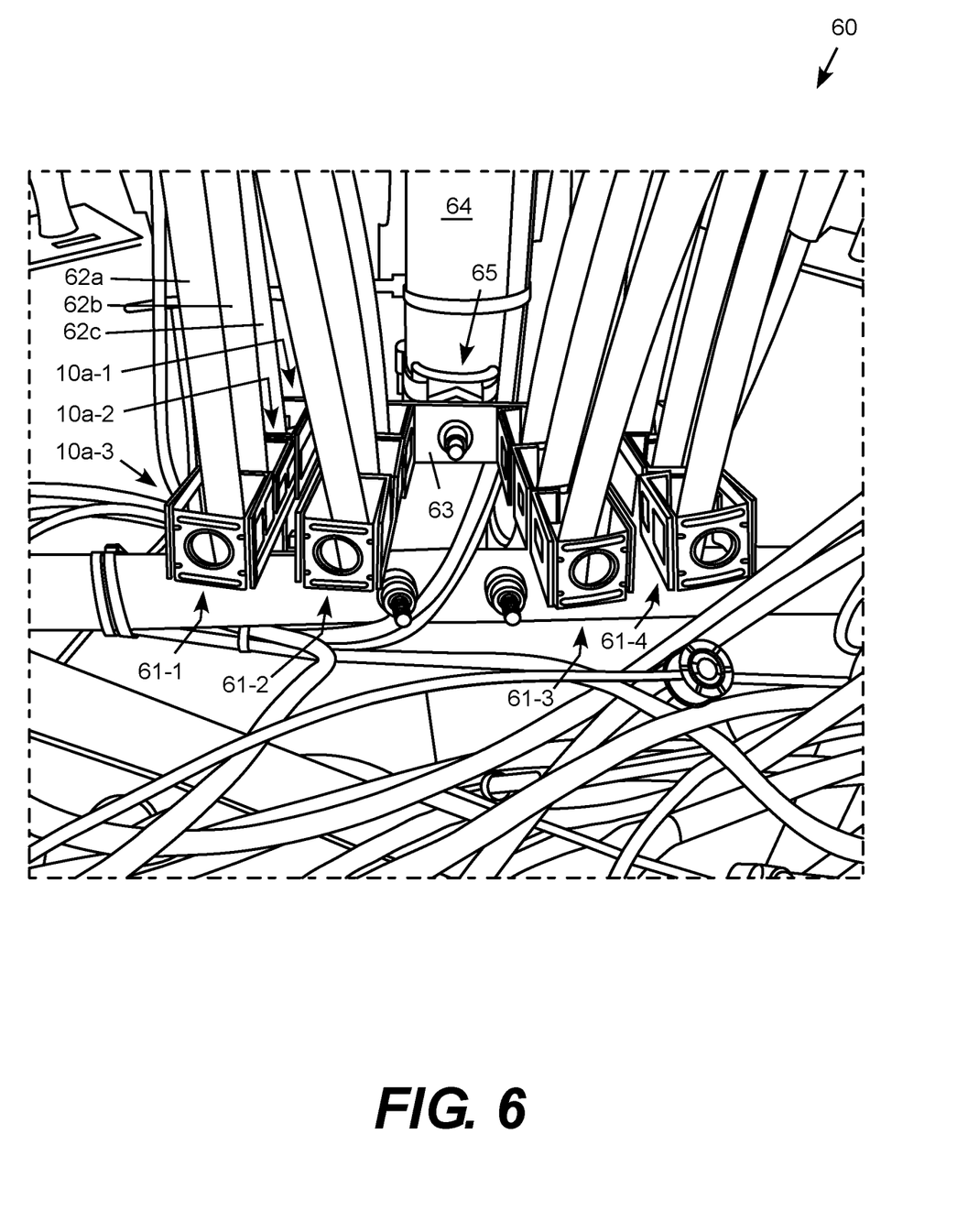
FIG. 6 is a perspective view of a portion of a cellular base station antenna site using multiple stacked arrays of the stackable low-PIM cable hangers.

FIG. 6 is a perspective view of a portion 60 of a cellular base station antenna site using multiple stacked arrays 61-1, 61-2, 61-3 and 61-4 of the stackable low-PIM cable hangers. Only one stacked array 61-1 is labeled with element numbers to avoid cluttering the figure. The stacked arrays 61-2, 61-3 and 61-4 are similar to the labeled stacked array 61-1. In addition, the arrangement shown in FIG. 6 is similar to the arrangement shown in FIG. 4, except that each cable hanger 10a, 10b, 10C and 10d shown in FIG. 4 has, in FIG. 6, been replaced with a stacked array of cable hangers 61-1, 61-2, 61-3 and 61-4, respectively. In this particular example, the mounting plate 63 directly supports the cable hanger 10a-1, which supports cable hanger 10a-2 (i.e., the snap-in legs of the cable hanger 10a-2 are snapped into the receptacle hole of cable hanger 10a-1), which supports cable hanger 10a-3 (i.e., the snap-in legs of the cable hanger 10a-3 are snapped into the receptacle hole of cable hanger 10a-2). The mounting plate 63, which is connected to the support pole 64 using the low-PIM cable bracket 65, thus supports twelve low-PIM, stackable cable hangers. In this configuration, the stacked arrays 61-1, 61-2, 61-3 and 61-4 are positioned close enough to each other to raise the possibility that the outer sides of a cable block may make contact with a cable block of an adjacent stacked array. The polymeric sleeve sides cover and thus prevent the metal sides of the cable blocks from contacting each other to avoid metal-to-metal contact and the resulting PIM generation.

Figure 7:
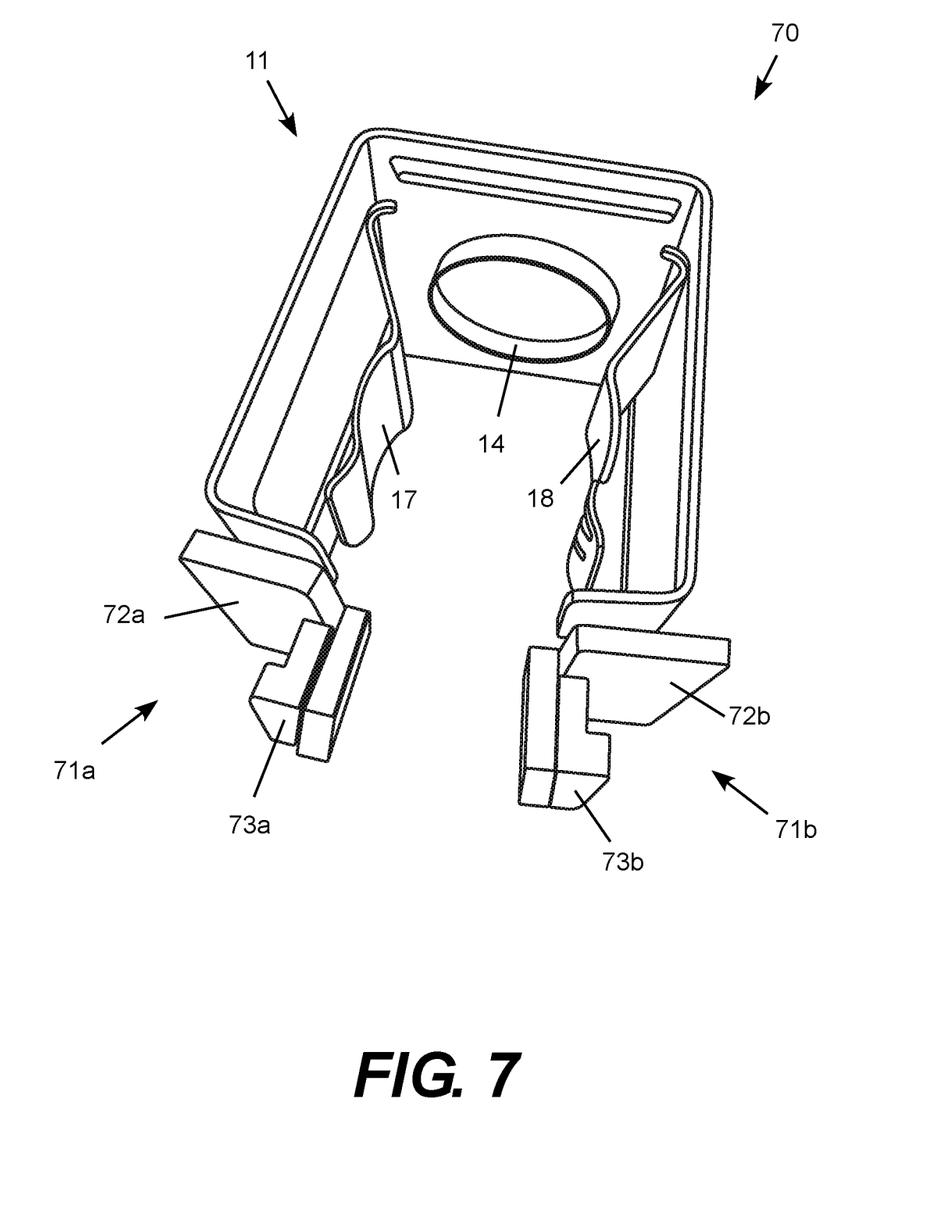
FIG. 7 is a perspective view of a first alternative stackable low-PIM cable hanger.

FIG. 7 is a perspective view of a first alternative stackable low-PIM cable hanger 70. This alternative is similar to the previously described cable hanger 10 except that the polymeric sleeve 12 has been replaced by polymeric feet 71a-b molded over or adhered to the feet or bases of the cable block 11. The polymeric feet 71a-b include lateral plates 72a-b for separating adjacent cable blocks from each other (or from another support surface) and orthogonal legs 73a-b for attaching one cable block to an adjacent cable block (or another support surface). FIG. 7 also shows the flange 14 defining the receptacle hole of the cable block 11 and the cable clasps 17, 18.

Figure 8:
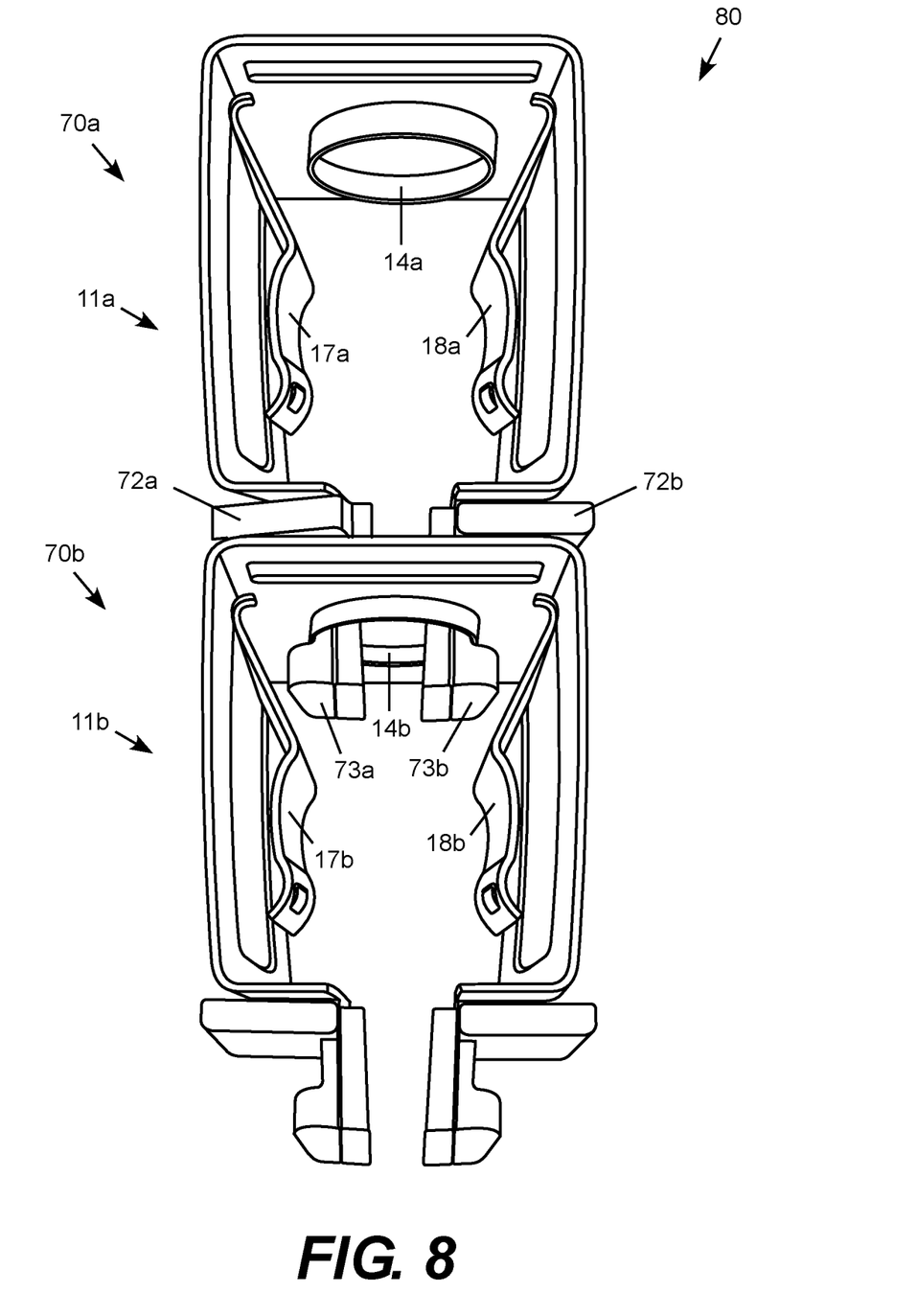
FIG. 8 is a front view of two of the first alternative stackable low-PIM cable hangers stacked together.
Figure 9:
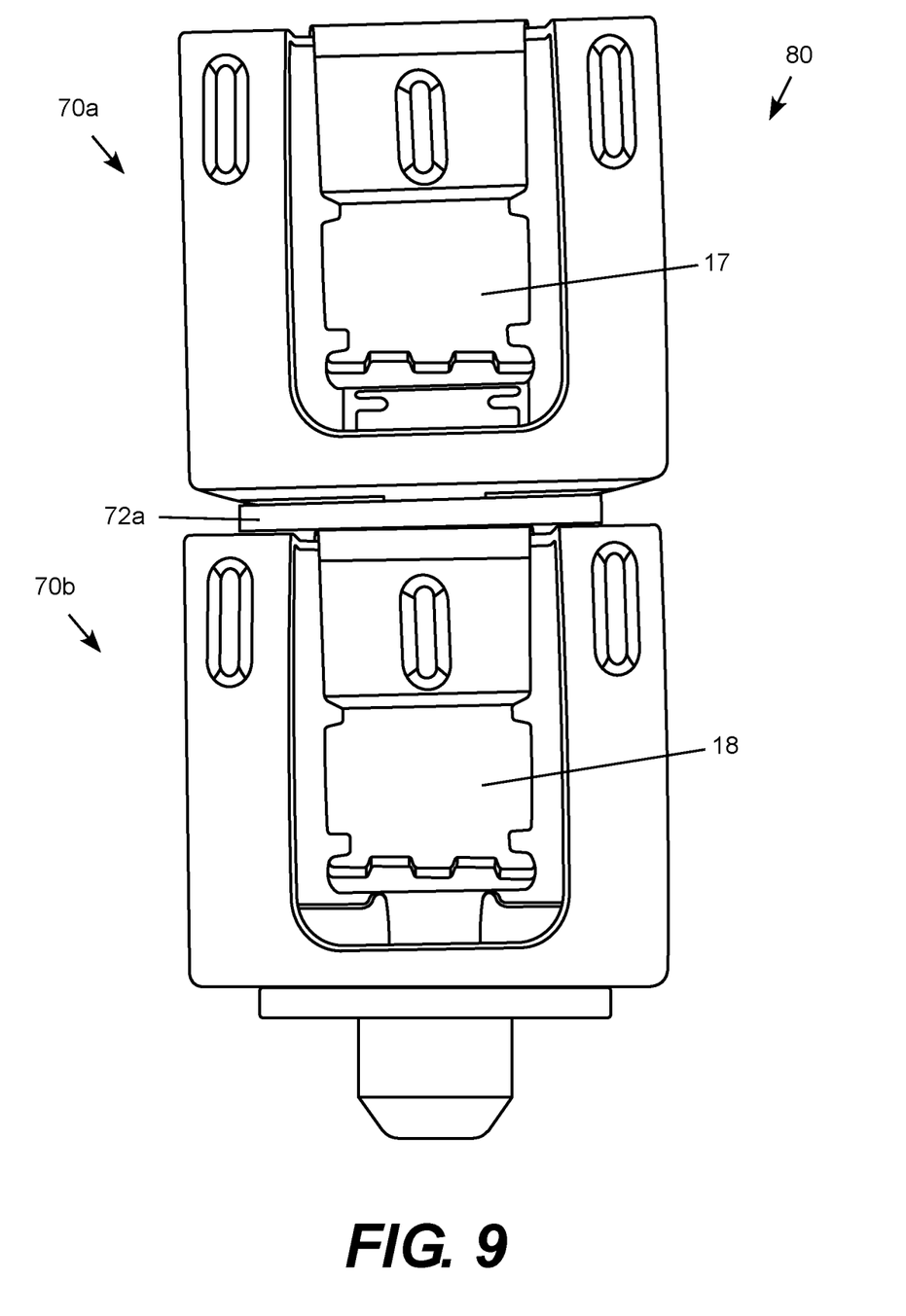
FIG. 9 is a side view of two of the first alternative stackable low-PIM cable hangers stacked together.

FIG. 8 is a front view and FIG. 9 is a side view of two of the first alternative stackable low-PIM cable hangers 70a-b stacked together. The orthogonal legs 73a-b of the upper cable hanger 70a are received within the receptacle hole of the lower cable hanger 70b with their barbs captured against the flange 14b of the lower cable hanger. The plates 72a-b of the upper cable hanger 70a are disposed between the metal cable blocks 11a-b of the upper and lower cable hangers 70a-b to prevent lose metal-to-metal contact between the cable blocks.

Figure 10:
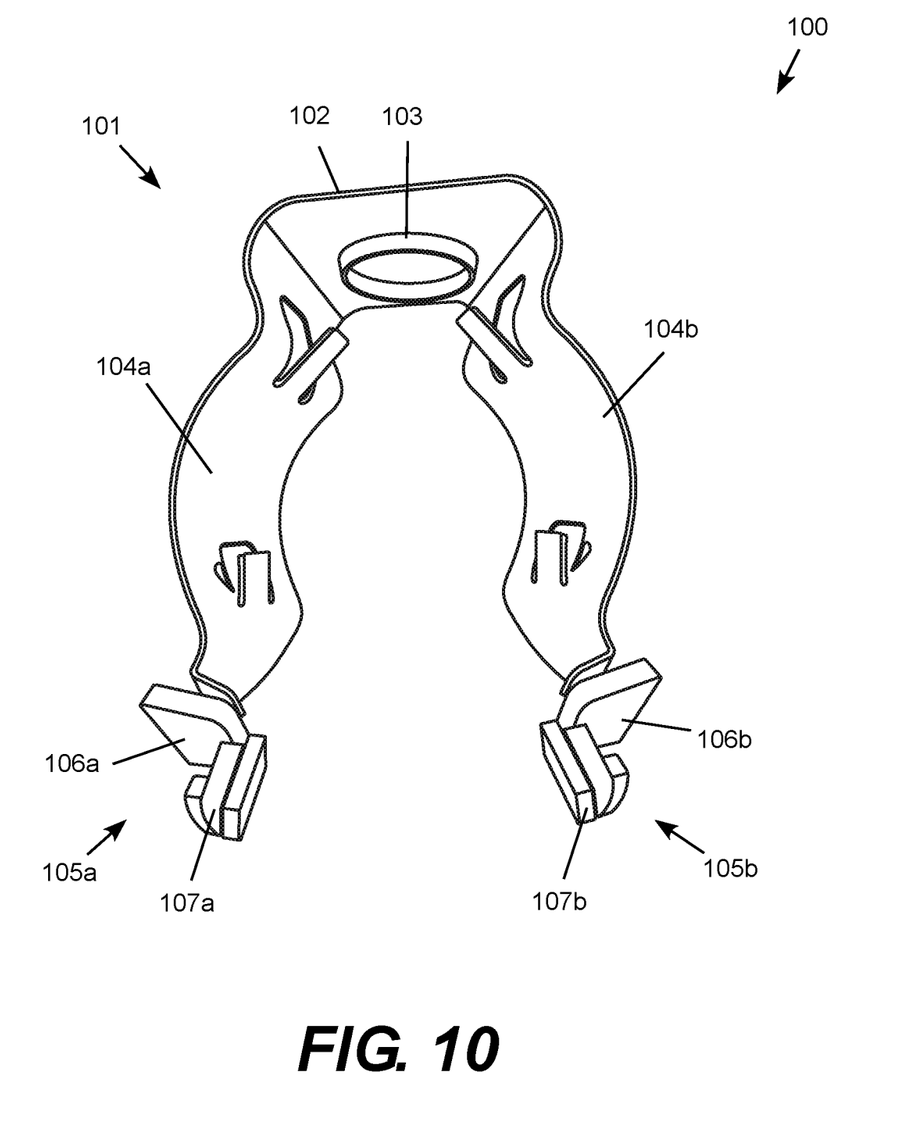
FIG. 10 is a perspective view of a second alternative stackable low-PIM cable hanger.

FIG. 10 is a perspective view of a second alternative stackable low-PIM cable hanger 100. This alternative includes a cable block 101 with a receptacle side 102 including a flange 103 defining a receptacle hole. Cable clasps 104a-b extend away from the receptacle side 102 to polymeric feet 105a-b molded over or adhered to the feet or bases of the cable block 101. The polymeric feet 105a-b include lateral plates 106a-b for separating adjacent cable blocks from each other (or from another support surface) and orthogonal legs 107a-b for attaching one cable block to an adjacent cable block (or another support surface).

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A low-PIM, stackable cable hanger, comprising:
   a metallic cable block comprising a receptacle side defining a receptacle hole for stacking the cable block to an adjacent cable block, a pair of metal sides, each metal side positioned to extend away from the receptacle side and comprising a cable clasp for supporting a cable positioned to extend through the cable block;
   a pair of polymeric sides, each positioned adjacent to a corresponding one of the metal sides of the cable block;
   a pair of polymeric snap-in legs for fitting into an adjacent receptacle hole.

2. The low-PIM, stackable cable hanger of claim 1, wherein each of the metal sides of the cable block further comprises a block clip in engagement with one of the polymeric sides.

3. The low-PIM, stackable cable hanger of claim 1, wherein each of the polymeric sides further comprises a polymeric sleeve clip in engagement with one of the metal sides of the cable block.

4. The low-PIM, stackable cable hanger of claim 1, wherein:
   each of the metal sides of the cable block further comprises a block clip in engagement with one of the polymeric sides;
   each of the polymeric sides further comprises a polymeric sleeve clip in engagement with one of the metal sides of the cable block.

5. The low-PIM, stackable cable hanger of claim 1, wherein:
   each of the snap-in legs comprises a barb head for becoming captured by the adjacent receptacle hole when the snap-in legs of the polymeric sleeve are inserted into the adjacent receptacle hole.

6. The low-PIM, stackable cable hanger of claim 1, wherein:
   the snap-in legs are configured to be deflected toward each other as the snap-in legs are partially inserted into the adjacent receptacle hole;
   the snap-in legs are configured to spring away from each other to become captured in the adjacent receptacle hole when the snap-in legs are fully inserted into the adjacent receptacle hole.

7. An array of low-PIM, stackable cable hangers, comprising:
   a first low-PIM, stackable cable hanger comprising a first metallic cable block comprising a first receptacle side defining a first receptacle hole for stacking the first cable block to a first adjacent cable block, a first pair of metal sides, each positioned to extend away from the first receptacle side and comprising a first cable clasp for supporting a first cable positioned to extend through the first cable block, and a first pair of polymeric snap-in legs for fitting into a first adjacent receptacle hole;
   a second low-PIM, stackable cable hanger comprising a second metallic cable block comprising a second receptacle side defining a second receptacle hole for stacking the second cable block to a second adjacent cable block, a second pair of metal sides, each of the second pair of metal sides positioned to extend away from the second receptacle side and comprising a second cable clasp for supporting a second cable positioned to extend through the second cable block, and a second pair of polymeric snap-in legs for fitting into a second adjacent receptacle hole;
   the first cable hanger further comprising a first pair of polymeric sides, each positioned adjacent to a corresponding one of the metal sides of the first cable block;
   the second cable hanger further comprising a second pair of polymeric sides, each positioned adjacent to a corresponding one of the metal sides of the second cable block;
   wherein the first snap-in legs of the first polymeric sleeve are received within the second receptacle hole of the second cable block to attach the first cable block to the second cable block.

8. The array of low-PIM, stackable cable hangers of claim 7, wherein:
   each of the first pair of snap-in legs comprises a barb head captured by the second receptacle hole;
   the barb heads of the first pair of sap-in legs are rotatably engaged with the second receptacle hole.

9. The array of low-PIM, stackable cable hangers of claim 7, wherein:
   the first pair of snap-in legs are configured to be deflected toward each other as the first snap-in legs are partially inserted into the second receptacle hole;
   the first pair of snap-in legs are configured to spring away from each other to become captured in the second receptacle hole of the second cable block when the first pair of snap-in legs are fully inserted into the second receptacle hole.

10. The array of low-PIM, stackable cable hangers of claim 9, wherein:
    each of the metal sides of the first cable block further comprises a block clip in engagement with one of the first pair of polymeric sides;
    each of the metal sides of the second cable block further comprises a block clip in engagement with one of the second pair of polymeric sides.

11. The array of low-PIM, stackable cable hangers of claim 9, wherein each of the polymeric sides further comprises a polymeric sleeve clip in engagement with one of the metal sides of one of the block clips.

12. The array of low-PIM, stackable cable hangers of claim 9, wherein:
    each of the metal sides of each cable block comprises a block clip in engagement with one of the polymeric sides; and
    each of the polymeric sides comprises a polymeric sleeve clip in engagement with one of the metal sides of one of the cable blocks.

13. A method for low-PIM, stackable cable hanging, comprising:
    providing a first low-PIM, stackable cable hanger comprising a first metallic cable block comprising a first receptacle side defining a first receptacle hole for stacking the first cable block to a first adjacent cable block, a first pair of metal sides, each positioned to extend away from the first receptacle side and comprising a first cable clasp for supporting a first cable positioned to extend through the first cable block, and a first pair of polymeric snap-in legs for fitting into a first adjacent receptacle hole;
    providing a second low-PIM, stackable cable hanger comprising a second metallic cable block comprising a second receptacle side defining a second receptacle hole for stacking the second cable block to a second adjacent cable block, a second pair of metal sides, each of the second pair of metal sides positioned to extend away from the second receptacle side and comprising a second cable clasp for supporting a second cable positioned to extend through the second cable block, and a second pair of polymeric snap-in legs for fitting into a second adjacent receptacle hole;
    providing the first cable hander with a first pair of polymeric sides, each covering one of the metal sides of the first cable block;
    providing the second cable with a second pair of polymeric sides, each covering one of the metal sides of the second cable block;
    placing a first cable between the first cable clasps of the first cable block;
    attaching the first cable hanger to a mounting structure by inserting the first snap-in legs of the first cable hanger into a receptacle of the mounting structure;
    placing a second cable between the second cable clasps of the second cable block; and
    attaching the second cable hanger to the first cable block by inserting the second snap-in legs of the second cable hanger into the first receptacle hole of the first cable block.

14. The method of claim 13, wherein:
    each of the first pair of snap-in legs comprises a barb head captured by the second receptacle hole;
    the barb heads of the first pair of sap-in legs are rotatably engaged with the second receptacle hole.

15. The method of claim 13, further comprising:
    partially inserting the first pair of snap-in legs into the second receptacle hole to deflect the first pair of snap-in legs toward each;
    fully inserting the first pair of snap-in legs into the second receptacle hole to allow the first pair of snap-in legs to spring away from each other to become captured in the second receptacle hole.

16. The method of claim 13, further comprising providing the first cable block with a pair of metal block clips, each in engagement with one of the polymeric sides;
    providing the second cable block with a pair of metal block clips, each in engagement with one of the polymeric sides.

17. The method of claim 13, further comprising providing each polymeric side with a polymeric sleeve clip in engagement with one of the metal sides of one of the cable blocks.

* * * * *